US010192171B2

(12) United States Patent
Taylor

(10) Patent No.: US 10,192,171 B2
(45) Date of Patent: Jan. 29, 2019

(54) METHOD AND SYSTEM USING MACHINE LEARNING TO DETERMINE AN AUTOMOTIVE DRIVER'S EMOTIONAL STATE

(71) Applicant: Wheego Electric Cars, Inc., Atlanta, GA (US)

(72) Inventor: Thomas Steven Taylor, Atlanta, GA (US)

(73) Assignee: AUTONOMOUS FUSION, INC., Atlanta, GA (US)

( * ) Notice: Subject to any disclaimer, the term of this patent is extended or adjusted under 35 U.S.C. 154(b) by 38 days.

(21) Appl. No.: 15/382,092

(22) Filed: Dec. 16, 2016

(65) Prior Publication Data

US 2018/0174457 A1 Jun. 21, 2018

(51) Int. Cl.
*G06N 99/00* (2010.01)
*B60W 40/09* (2012.01)
(Continued)

(52) U.S. Cl.
CPC .......... *G06N 99/005* (2013.01); *B60W 40/09* (2013.01); *G06K 9/00302* (2013.01); *G06K 9/00832* (2013.01); *G08G 1/0962* (2013.01); *G08G 1/09675* (2013.01); *G08G 1/096716* (2013.01); *G08G 1/096741* (2013.01); *G08G 1/096791* (2013.01); *B60W 2420/42* (2013.01); *B60W 2540/10* (2013.01); *B60W 2540/12* (2013.01); *B60W 2540/14* (2013.01); *B60W 2540/18* (2013.01); *B60W 2540/20* (2013.01); *B60W 2540/22* (2013.01); *B60W 2750/40* (2013.01)

(58) Field of Classification Search
CPC ............. B60W 2750/40; B60W 40/09; B60W 2420/42; G08G 1/161; G06N 99/005
See application file for complete search history.

(56) References Cited

U.S. PATENT DOCUMENTS 9,623,876 B1 * 4/2017 Slusar .................. B60W 40/09
2004/0002638 A1 * 1/2004 Yanagidaira ............. A61B 5/18
600/300

(Continued)

*Primary Examiner* — Brian A Zimmerman
*Assistant Examiner* — Sara B Samson
(74) *Attorney, Agent, or Firm* — Doughty Law, L.L.C.; John L. Doughty

(57) ABSTRACT

Information generated by human behavior detection sensors (i.e., cameras, microphones, pressure sensors, wearables), and vehicle operational parameter information train a machine learning model to determine a driver's emotional state based on vehicle operational parameter information. The training information may be transmitted by a wireless device for each of a fleet of vehicles and their human driver during a training period. A vehicle driven after the training period may provide vehicle information, vehicle location information, VIN, vehicle operational parameter information, or driver emotional state parameter information to a central computer that may compare the received information to either the trained machine learning model or criteria generated as a result of training the model, to determine whether the first driver, or a second driver of a vehicle proximate the first driver's vehicle, is driving erratically or in an elevated emotional state, and alert the other driver if such a determination is made.

18 Claims, 5 Drawing Sheets

(51) Int. Cl.
*G06K 9/00* (2006.01)
*G08G 1/0962* (2006.01)
*G08G 1/0967* (2006.01)

(56) References Cited

U.S. PATENT DOCUMENTS

| | | | | |
|---|---|---|---|---|
| 2010/0109881 A1* | 5/2010 | Eskandarian | ........ | A61B 5/6887 |
| | | | | 340/575 |
| 2015/0051826 A1* | 2/2015 | Basson | .............. | G01C 21/3697 |
| | | | | 701/437 |
| 2016/0283963 A1* | 9/2016 | Zafiroglu | ........... | G06Q 30/0224 |
| 2017/0176198 A1* | 6/2017 | Tatourian | ........... | G01C 21/3453 |

* cited by examiner

METHOD AND SYSTEM USING MACHINE LEARNING TO DETERMINE AN AUTOMOTIVE DRIVER'S EMOTIONAL STATE

FIELD

Aspects herein relate to enhancing driving safety through technological interaction with a vehicle.

BACKGROUND

It has been shown that an automobiles driver's emotional state can have a large effect on driver safety. An angry state can cause drivers to make rash movements on the highway, often at high speeds. A depressed state can cause drivers to react slowly or not at all. Elation may cause a driver to reduce attention to the task of driving. Anger, depression, and elation are examples of elevated emotional states.

SUMMARY

As emotional states are very complex human conditions, aspects described herein may use machine learning to learn complex patterns of human action that can make up, and result from, an elevated emotional state. Once the emotional state is detected and categorized, an appropriate machine-learning directed change can be made to the vehicle environment. For example, environmental changes inside a driven vehicle's cabin may be made in response to a determination that a driver of a driven vehicle is currently in an elevated emotional state. For example, when a driver is determined to be driving while angry, calming aromatic and music systems may be deployed. The seat cushions can become softer and the seat position is moved to a more relaxed position. For depressed drivers, arousing aromatic air and music may be deployed. The seat cushions may be hardened, and the seat position is made more erect. In an aspect, processors in a vehicle, or remote from the vehicle, may cause the deploying of music, freshened or conditioned air via the HVAC system, softening of vehicle suspension, steering, and throttle response settings, lighting changes, etc. in response to determining that a driver, or a passenger, is driving in an elevated emotional state. The changes to vehicle setting may be made in accordance with the elevated state. For example, if a driver is deemed to be sleepy or inattentive, the processor may cause the stereo to begin playing rock and roll music, may cause the HVAC system to blow cold air, or may cause the power windows to be rolled down. Or, if instructions executed by the processor result in a determination that the driver is driving in an angry emotional state, the processor may cause the stereo to play relaxing, soothing music and warm up the cabin temperature. The processor may cause other combinations of vehicle settings of music, climate control, steering wheel position and resistance, suspension settings, seat hardness and temperature, seat recline angle and height, interior lighting, etc. that instructions executing thereon cause it to determine are appropriate to mitigate the elevated emotional state of the driver.

The terminology 'elevated emotional state' may refer to a variety of emotional states that deviate from a normal, baseline, common profile that an alert, attentive driver typically has. Other than anger and aggressiveness, other examples of elevated emotional states may include: fatigue and sleepiness, stress, irritation, nervousness (which may be indicative of drug use or driving under the influence), sadness, elation, timidity (this may not be a negative, but may be indicative of a driver who lacks confidence, such as an elderly driver, a new/young driver, a driver who is ill, a driver who has vision difficulty, or a driver who may not be comfortable driving in less than perfect weather, lighting, and traffic conditions).

In an aspect, a driver that is not currently in an elevated emotional state may be proximate other drivers who are operating their vehicle, or vehicles, erratically because they are agitated, or otherwise in an elevated emotional state, such as: angry, upset, distracted by elation, etc. In an aspect, the driver of the vehicle that is close to, or surrounded by, one or more other vehicles that may be driven by drivers in an elevated emotional states may receive an alert that one or more other vehicles that are proximate within a predetermine range or distance of the driver's current location are along a route that the driver plans to traverse, or are approaching the driver's vehicle. The alert may be based on a current evaluation of vehicle operational characteristics derived from vehicle sensor information of the proximate vehicles, or based on driver behavior information derived from driver/human sensor information generated by sensors that detect human characteristics of the drivers of the proximate vehicles. Or, an alert provided to a driver may be based on a determination that the one or more proximate vehicles are driven by a driver, or driver, who has, or have, a history of erratic driving or driving while in an elevated emotional state. A sensor in, or at, the driver's vehicle may determine the identity of the proximate vehicles based on a camera image of the proximate vehicles' license plates, or the driver's vehicle or smart phone may wirelessly receive information that identifies the proximate vehicles via a vehicle-to-vehicle communication. Alternatively, the driver's vehicle may transmit information describing the driver's current location, such as Global Positioning Satellite ("GPS") coordinates or wireless device location information based on communication by a wireless device at the vehicle with a wireless communication network, to a central server, such as, for examples, a telematics services provider's server or traffic information service provider's server, to perform the determination of whether other vehicles, which may also be in communication with the driver's vehicle, are driven by a driver who currently is driving in an elevated emotional state, or has a history of driving in an elevated emotional state. In another aspect, a driver of a vehicle may receive an alert at a device, such as a personal smart phone or an infotainment system built into his, or her, vehicle, if the location where he, or she, is currently operating their vehicle has a history of being traversed by drivers driving in an elevated emotional state, or a history of a high level of erratic driving by drivers—for example, roadways outside a sports stadium predetermined amounts of time before or after a sporting event occurs. A central server may perform the determination of such a likelihood, or a driver's smart phone may include data that the device can use to make the determination based on the current location of the device. A driver's smart phone may query a central server to determine whether drivers driving in elevated states are proximate (based on the querying devices current location information), or whether the driver's current location is prone to being traversed by vehicle driven by emotionally elevated drivers, or whether emotionally elevated drivers are currently likely to be driving nearby based on context (i.e., weather, natural disaster, predetermined amount of time before or after a sporting event, music event, political rally, or other event that tends to draw a large crowd in a certain area). The driver's smart phone, or the central server, may cause the sending of, or generating or, and alert, or other action such adjusting the driver's vehicle's setting sin response to being possible near another driver who is driving in an elevated state. For example, the driver's vehicle that is near another vehicle being driven by a driver in an elevated emotional state may be caused to turn down its audio volume, decrease a seat inclination angle (i.e., cause it to become more upright), etc. to increase alertness of the driver.

A method comprises, receiving vehicle information from one or more vehicles proximate a driven vehicle within a predetermined area relative to the driven vehicle, evaluating the received vehicle information, determining that one of the one or more of the vehicles proximate the driven vehicle is driven by a driver associated with an elevated emotional state when the evaluated vehicle information corresponds to driving a vehicle in an elevated emotional state, and causing an alert, or other action, at the driven vehicle, based on the determining that one or more of the vehicles proximate the driven vehicle is driven by a driver associated with an elevated emotional state.

The received information may include vehicle information that uniquely identifies each of one or more of the one or more vehicles proximate the driven vehicle. The received vehicle information may include license plate information, descriptive information (such make, model, color, body style, etc.), and vehicle identification number ("VIN"). The received vehicle information may include location information. The received vehicle information includes vehicle operational parameter information generated by one or more sensors in communication with a communication bus of the one or more vehicles. The received vehicle information includes driver behavior characteristic information generated by one or more sensors that measure emotional state parameter information of a driver. These sensors may detect human characteristics of drivers, which may be referred to as emotional state parameter information. At least some of the received information may be applied to a criteria set of a trained emotional state machine learning model, wherein the at least some of the received information applied to the criteria set of a trained emotional state machine learning model does not include emotional state parameter informational. The criteria set may comprise limits, thresholds, or other parameters corresponding to parameters for information that may contain measured data, or that may be derived from measured data, and that may be contained in information sent from a vehicle, including vehicle operational parameter information. Criterion, or criteria, in the criteria set may be generated during a training period during which as machine learning model is trained, and may be revised results, or outputs, of a machine learning model after it has been trained. The machine learning model may be configured with baseline elevated emotional state parameter functions, coefficients, values, etc. that becomes trained elevated emotional state parameter functions, coefficients, values, etc. that are used by the machine learning model to evaluate information received from one or more vehicles.

Information received from one or more vehicles may be applied as inputs to the machine learning model to evaluate the information to determine whether a vehicle that transmitted in the information is currently being driven by a driver in an elevated emotional state. The trained machine learning model may make such a determination of a current driver/vehicle instance by only evaluating vehicle operational parameter information received from a device in the vehicle without the need for information that contains human behavior sensor characteristic data (i.e., emotional state parameter information), because the machine learning model would have already been trained with inputs that include vehicle operational parameter information and corresponding emotional state parameter information and how these types of information relate to one another. Thus, the trained machine learning model may determine a driver's emotional state by only evaluating vehicle operational parameter information. Alternatively, a set of parameters that are generated as a result of the training of an emotional state machine learning model may be used for direct comparison to vehicle operational parameter information received from a vehicle currently being driven to determine whether the driver of that vehicle is currently driving in an elevated emotional state.

DETAILED DESCRIPTION

Figure 1:
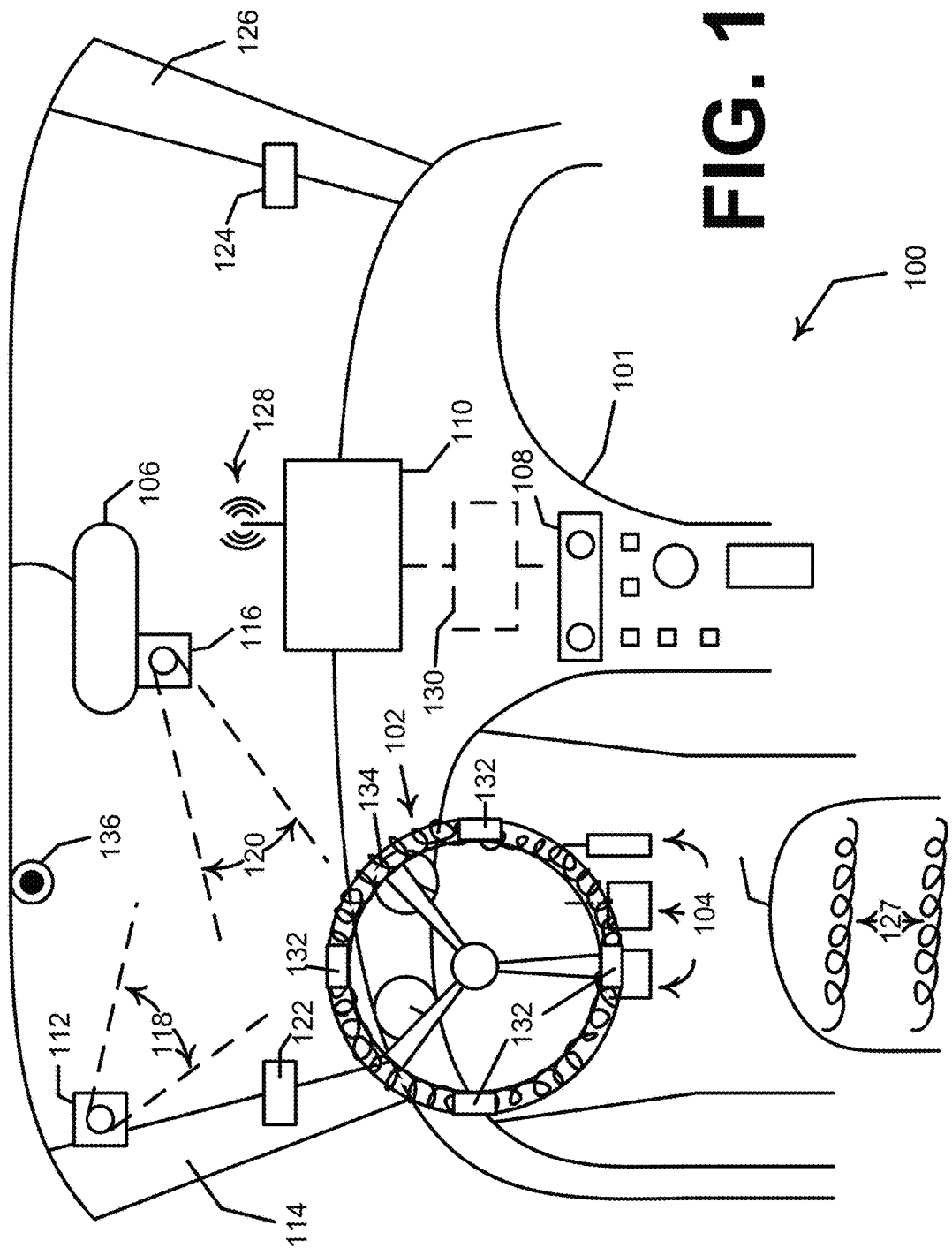
FIG. 1 illustrates a cockpit of an automobile having various sensors for detecting behavior of a driver.

As a preliminary matter, it will be readily understood by those persons skilled in the art that the present invention is susceptible of broad utility and application. Many methods, aspects, embodiments, and adaptations of the present invention other than those herein described, as well as many variations, modifications, and equivalent arrangements, will be apparent from, or reasonably suggested by, the substance or scope of the described aspects.

Accordingly, while the present invention has been described herein in detail in relation to preferred embodiments and aspects, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

An automobile can be outfitted with a plethora of sensors such as cameras, accelerometers, gyroscopes, magnetic compass, stress/strain gauges, radar, LIDAR, ultrasonic, microphones and others. These sensors can be used an inputs to a system of one or more machine learning models. The machine learning can be done is a layered approach, based on the type of sensor and the data accumulated.

One layer of machine learning can focus on processing signals from cameras inside the vehicle that are pointed at the driver's face. These computer images will not be used for facial recognition but for emotion recognition. While machine learning systems for facial recognition are useful, they are not sufficient for a highly confident characterization of the driver's face and expressions thereon. There are also mitigating factors in facial camera systems for emotion sensing such as sunglasses during the day or low light levels at night.

To complete the system, other layers of emotional input may be used. A second layer is the motion of the vehicle and how it pertains to the context that the vehicle is in. Outward looking cameras, radars, ultrasonic and LIDAR systems can be used to observe the motion of the vehicle on the road or within traffic. This transportation context may help understand an emotional state of a driver. For example, rapid swerving of the vehicle can mean an inattentive driver is the context of a free and open highway. Or, rapid swerving can mean the opposite: A very attentive driver, negotiating debris in the roadway. The motion cameras may provide input to a machine learning system, or machine learning model, to enhance computer vision to help understand the transportation/operational context of the vehicle. A second aspect of this transportation/operational context can be outward facing microphones. These microphones may 'listen' for emergency warning sounds, sirens, blaring horns etc. They may be another input layer (in addition to camera signal inputs) for the machine learning model to better understand the transportation context moment by moment (i.e., as driver-initiated operations such as braking, swerving, acceleration, etc., are performed.

Body motion and gestures and another key component of the machine learning layered input for this emotion detection system. Body motion and position is often a key component in discovering the driver's emotional state. Wild arm motions, specific hand configurations, pounding on the steering wheel or dashboard, excessive steering wheel pressure, loud screaming etc. can all be expressions of driver anger or rage. Just as the lack of arm and hand motion when there is severe traffic congestion can be an indication of severe depression. The input sensors for this layer of machine learning can be a mix of: cameras, microphones, accelerometers and gyroscopes on a wearable device, pressure sensors on steering wheel, dashboard or console or other devices. These inputs are another layer to the machine learning model to understand the motions, gestures and sounds in the transportation context. Once the context and emotional state are understood with a high degree of confidence, appropriate and pertinent actions can be taken.

Turning now to FIG. 1, the figure illustrates a cockpit 100 of a vehicle. Cockpit 100 includes familiar vehicle items and controls such as console/dash 101, steering wheel 102, and motion control pedals 104. The figure also shows a driver seat 105 and a rear view mirror 106, as well as an entertainment head unit 108 and an entertainment/navigation system display 110. A first camera 112 is shown attached to driver-side A pillar 114, and a second camera 116 is shown attached to mirror 106. First camera 112 and second camera 116 may be fixed and aimed to capture still or video images of the driver's facial expressions and head movement. Or, cameras 112 and 116 may be configured to automatically pan and zoom as a driver sitting in driver seat 104 may move so as to keep the driver's face centered in field-of-view 118 and field-of-view 120 of cameras 1126 and 116, respectively. A first motion sensor 122 may be mounted to driver side A-pillar 114, and a second motion sensor 124 may be attached to passenger side A-pillar 126. Driver seat 104 may include pressure sensors 127, which may be used merely to detect that a driver is sitting in driver seat 104, or sensors 127 may be sensitive enough and have enough sensitivity to be used in determining motion such as squirming by the driver, or to be used to determine movement of the driver in conjunction with motioned detected by detectors 122 and 124, as well as in conjunction with images captured with cameras 112 and 116. The figure shows a wireless link 128, which may be a short range wireless link (i.e., Bluetooth, Wi-Fi, and the like) or a long range wireless link (i.e., 4G LTE cellular data service, or similar). Wireless link 128 may be used to transmit information to, and to receive information from, a central communications-network-connected server, typically operated by a services provider, such as a telematics services provider, or link 128 may be used to communicate with a wireless communication device in the vehicle, such as a user's (perhaps the driver's or perhaps a passenger's) smart phone. Although not shown in the figure, a driver's or passenger's smart phone may capture motion, and gestures, and even images, of the driver and transmit such motion, gestures, or images, to a central processing unit 130 of the vehicle (shown embedded in cockpit 100 behind console 132 of the vehicle). Central processing unit 130 may be coupled to display 110, head unit 108, or both.

The services provider's central server, the central processing unit 130, or a user's smart phone, as well as any other computer devices that may be coupled via a communications link, such as a short range wireless link, long range wireless link, wired, or other link, to any or all of these devices may perform analysis of information produced by the sensor shown and described above in reference to FIG. 1, or of information acquired by other similar sensors that can detect a driver's gestures, evidence of a driver's emotion, or driving/vehicle operational characteristics of the driver. It will be appreciated that central processing unit 130 may be part of a vehicle's engine control module, or computer module connected with head unit 108 or display 110 via a vehicle communication bus, such as a controller area network ("CAN") bus, and thus operational information such as steering wheel motion (angle, rate of angular change), operation of accelerator, brake, and clutch pedals 104, as well as operation of other vehicle devices such as turn indicators, windshield wipers, etc. may be made available via the CAN bus to head unit 108, to a user's smart phone, or via a long range wireless link to a central server. In addition to information produced by vehicle devices, or devices in and associated with the vehicle, extrinsic information (i.e., information not generated by, or not directly related to a driver's operation of the driven vehicle, typically information generated or obtained remotely from the vehicle, but could also be information obtained by head unit 108 or a user's smart phone in the vehicle) may be obtained and processed by the central server, or forwarded thereby to either head unit 108 or a user's smart phone (which preferably would be in cockpit 100, but could be remote from the vehicle associated with the cockpit). Examples of such extrinsic information may include: weather surrounding the driven vehicle at a given time; weather at a destination that the driver is driving to; whether the driver has received a communication such as an SMS message, an e-mail message, or a phone call (which could potentially be upsetting); the location of the vehicle or the time of day and week when an emotionally-based vehicle operation, or use of, the driven vehicle may have occurred; location, speed, and traffic maneuvers of surrounding vehicles (such other vehicle information may not be available to the driver's smart phone or head unit 108, but may be available to a telematics services operator or a traffic information aggregator such as a government agency, a contractor thereto, or a commercial traffic information provider); the driver's appointments list, or calendar, (perhaps the driver is late for an appointment); the driven vehicle's fuel status and the proximity to a fuel station; whether the driven vehicle's Malfunction Indicator Light ("MIL") has recently illuminated; or whether a traffic aggregator or other organization that may process information of other vehicles along with corresponding extrinsic information corresponding to that other vehicle, or vehicles, has determine whether a particular driver of a vehicle recently proximate to the driven vehicle has operated the other vehicle, or vehicles, in a manner indicative of emotionally-based vehicle operation).

Processing of extrinsic information may provide an emotional event background, or context, associated with information associated with operation of the driven vehicle and information produced by sensors shown and described in relation to FIG. 1, that may indicate that the driver of the driven vehicle may have operated the driven vehicle in an agitated, elevated, disturbed, upset, sad, angry, or otherwise abnormal (for the particular driver) emotional state. Perhaps, information from sensors alone, or from sensors in conjunction with vehicle operation information available on a vehicle CAN communication bus may indicate that the driver is upset and operating the driven vehicle accordingly.

However, context information, such as a phone call from a family member, could indicate that perhaps a family member is in trouble, in which case the driver of the driven vehicle may be justified in driving in an unsafe manner (running a red light or stop sign when nothing is coming, which could be determined from a smart traffic light, or by a traffic aggregator which may constantly have real-time status information of traffic control signals surrounding the driven vehicle when the unsafe maneuvers are made). Thus, context information may be used in refining sensor information and vehicle operation of a driver that may be used in a profile of a driver, or in categorizing a driver's actions.

Regardless of the device, location thereof, or organization that operates devices (i.e., one or more computer servers to processes vehicle information along with corresponding extrinsic information), information contained in current behavior data signals information from sensors shown in cockpit 100 of FIG. 1, vehicle information from the driven vehicle's CAN bus, or extrinsic information available that may correspond to operation of the driven vehicle, may be used as training inputs to an emotional-state-determining machine learning model, which may include a neural network. Sensor, vehicle, or intrinsic/context information may be used to refine criteria used by a baseline emotional-state-determining neural network for further use in processing current driver behavior information. Information contained in current driving behavior information data signals may also be applied as training inputs to refine the trained emotional-state-determining machine learning model for use in analysis of information contained in future current driving period information behavior data signals.

Current driver behavior information refers to driver behavior information that occurs, is generated, or is acquired relative to a particular driving operation or instance, during a current driving period and after a training period when previous driver behavior information has been used to train the baseline emotional-state-determining neural network into a trained emotional-state-determining neural network. A current driving period may be a prescheduled period during a use of the driven vehicle. The current driving period may be a period beginning a predetermined first amount of time after start-up, or 'key-on' of the driven vehicle (the first time could be zero) and ending a predetermined second amount of time after the key-on (this could also occur at 'key-off.'

The current driving period could also be a predetermined period following a trigger event, which trigger event may be a particular vehicle operation performed by the driver of the driven vehicle, or the detection of an indication that the driver may be in a disturbed, or elevated, emotional state (as opposed to a calm and rational emotional state that may be established for a given driver during a training period). Such detection of a disturbed emotional state could be determined upon excessive squeezing of steering wheel 102, as determined by evaluation of signals produced by steering wheel accelerometer sensors 132, or pressure sensors 134. Pressure sensors 134 are shown as coiled wire on, or embedded in, steering wheel 102 in the figure, but may be implemented in other forms—the sensors 132 or 134 may be implemented in a steering wheel cover, such as an aftermarket steering wheel cover, that is designed to be placed on an existing steering wheel. The aftermarket steering wheel cover may be batter powered and may wirelessly transmit pressure signals to a communication bus of the vehicle it is used in, or to a user device such as a smart phone.

It will be appreciated that FIG. 1 shows four accelerometers 132 shown placed at discrete positions around steering wheel 102. Positioning of sensors 132 may be optimized based on a vehicle manufacturer's, or steering wheel manufacturer's, empirical test data. But, regardless of the number or positioning of sensors 132, impacts that register a higher acceleration at a first portion of steering wheel 102 may indicate a first behavior and indication of an impact at a second different location may indicate a second different behavior, or emotional state parameter. In addition, analysis of acceleration signals from sensors 132 could reveal, based on magnitude and frequency/spectrum analysis, whether an impact may have been the result of the driver slapping wheel 102, banging it with his, or her, fist, a light tap with a finger, or maybe a smart phone contacting the wheel as it drops to the floorboard of cockpit 100. This analysis could help distinguish between one emotional state and another.

In addition to acceleration signals from accelerometers 132, emotional state parameter signals from pressure sensors 134 may assist in characterizing a driver's emotional state. For example, if pressure sensors 134 generate signals corresponding to the driver suddenly gripping steering wheel 102 tightly and soon after sensors 132 generate signals corresponding to a high-magnitude blow with first spectral content to the steering wheel, head unit 108, a user's smart phone, or a central server that receives information from the vehicle, may determine that the driver suddenly squeezed the steering wheel hard and then hit it with a fist and thus a determination may be made that the driver is angry, and thus in a disturbed driver emotional state. However, if signals from pressure sensors 134 correspond to intermittent squeezing, and signals from accelerometers 132 correspond to multiple lighter taps by an open hand, as evidenced by acceleration signals exceeding a predetermined trigger threshold but by a lesser amount than a balled fist, and with each of the multiple instances where the magnitude exceeds the threshold the spectral analysis indicates higher frequency content that if a balled fist strikes wheel 102, then a determination may be made that the driver is merely 'drumming' along with a song playing from head unit 108 and thus is likely in a calm and rational (although possibly distracted) driver emotional state.

The emotional state determining machine learning model, whether baseline or updated/'trained' based on training information, may include more than a single type of machine learning model. For example, the emotional state determining machine learning model may comprise a neural network, such as a reinforcement neural network in which the neural network interacts with a dynamic environment with a task of performing a goal, but is not 'apprised' as it comes close to its goal, to evaluate new driver behavior input data (i.e., from sensors in cockpit 100) and to revise itself as its 'knowledge base' of information grows and it refines itself as to what type of behavior tends to correspond to a given type of disturbed driver elevated emotional state. The emotional state determining machine learning model may also comprise a deep learning neural network for processing image and video information from cameras 112 and 116, and for processing sound that may originate from microphone 136, which may be fixed to the ceiling of cockpit 100, or a microphone that may be part of a user's smart phone.

The deep learning neural network may process sound and light signals independently of the reinforcement neural network. In this aspect, the deep learning neural network processes light signals from cameras 112 and 116, for example, to determine whether the driver in cockpit 100 is making an angry gesture, a happy gesture, whether the driver is moving to lean out of the car and make a gesture with his, or her, hand out a lowered side window, etc. Thus, by processing light signals from cameras 112 and 116, the deep learning neural network is performing an elementary 'vision' process rather than just performing image recognition from the cameras' signals. This vision includes evaluating that the driver is moving, but gleaning more from this information than just that the driver is moving. Rather, the movement that the combination of the camera and the deep learning algorithm 'see' can refine baseline neural network factors when processed with other information, for example vehicle operation information, to distinguish certain movement that does not indicate a particular emotion (i.e., moving an arm to turn on headlights or to activate a turn signal) from certain movement that likely does (i.e., lowering the driver side window and moving the driver's driver-side arm out the window while making a gesture).

Similarly, a deep learning portion of the emotional-state-determining neural network may perform 'hearing' of sounds with cockpit 100 rather than just performing voice recognition to determine particular words that are uttered. For example, if a driver says the words "take your time" while talking on the phone to a family member, the deep learning algorithm may learn the volume, intonation, rising or falling volume and syllabic accents, that the driver uses when uttering these words to his or her spouse, or boss, and make the assumption that such speech pattern is associated with a calm and rational mood, or emotional state. However, if the same driver utters the same words "take your time", but the driver has been following another vehicle on a two-lane road approaching a traffic control device at below the speed limit for the particular road segment and has been frequently applying the brakes in doing so, the deep learning neural network may associate a higher volume level, emphasis of different syllables as if uttered sarcastically, with an agitated emotional state.

After determining 'seeing' and 'hearing' activity by the driver and that the associated light signals and sound signals correspond to a disturbed emotional state of the driver, the deep learning neural network may provide such a conclusion into another stage of the emotional state determining machine learning model that processes the visual and auditory stage along with vehicle operation information it may receive along with extrinsic information to make a conclusion that the driver is in a disturbed emotional state. Upon determining that the driver is in a disturbed/elevated emotional state, the machine learning model may provide such a determination to head unit 108, which may instruct the vehicle's engine control module to moderate fuel delivery to the vehicle's engine, or at least provide a warning to the driver that he, or she, should calm down. Alternatively, the head unit, or other device coupled to the vehicle could, provide the information to the user's smart phone, which may then either store the disturbed emotion determination, or store and send it to a network endpoint or device, such as a parent's e-mail address or smart phone.

In another aspect, a vehicle platform/system, such as a telematics system that comprises communication devices in vehicles, and a back-end central computer/server platform in communication with the vehicle communication devices, may monitor locations of various customers or subscribers of its services and notify one or more of them that they may be within a predetermined distance of a driver who has been deemed as currently in an elevated emotional state based on his, or her, current driving behavior. The backend platform/server may analyze vehicle operational parameter information of vehicles that it can monitor, that may be received from signals received from the communications devices in vehicles, or from user devices such as smart phones, that may transmit location and movement information to a traffic monitoring system, an insurance company's vehicle monitoring system, from sensors constructed on, around, or as part of, a road system, or other systems that may obtain and analyze a driver's, or a vehicle's, movement and operational characteristics in real time.

The vehicle analysis system/platform may apply real-time operational vehicle parameter information that it receives to criteria, functions, coefficients, etc. that may have been determined by applying operational driving data and drivers' emotional state information to a machine learning model during a training period. By learning how drivers' operational behavior corresponds to drivers' emotional states, a machine learning model may 'learn' how to determine that a driver is in an elevated, or dangerous, emotional state just by analyzing vehicle operational parameter information, i.e., acceleration, braking, rapidity of steering wheel position change for a given speed, speed around a turn, the application of acceleration, braking, steering input prior to passing through a traffic control device changing from states (e.g., from yellow to red). In addition, the context of surrounding traffic conditions, temporal relationship of a driver to a scheduled event, information about which may be gleaned from a driver's user device's contacts or calendar, may be used to enhance the determination of relationships between driving condition information and vehicle operation parameter information and emotional state parameter information. Thus, by applying known emotional state parameter information about a driver as determined by means such as camera images, sound signals, gripping of a vehicle's steering wheel, aggressiveness of applying braking, etc., applying corresponding vehicle operational parameter information, which may be obtained solely from drivers' user devices, or from vehicle sensor information, such as brake sensors, wheel speed sensors, steering wheel angle sensors, accelerator position sensor, etc., and applying context information such as traffic information and vehicle information received from other vehicles or user devices, a machine learning model can be trained to recognize emotional states of drivers solely based on vehicle information received from a driver's vehicle or the driver's user device, or based on received vehicle information and received traffic information (which may be determined based on vehicle information received from one or more other vehicle).

Figure 2:
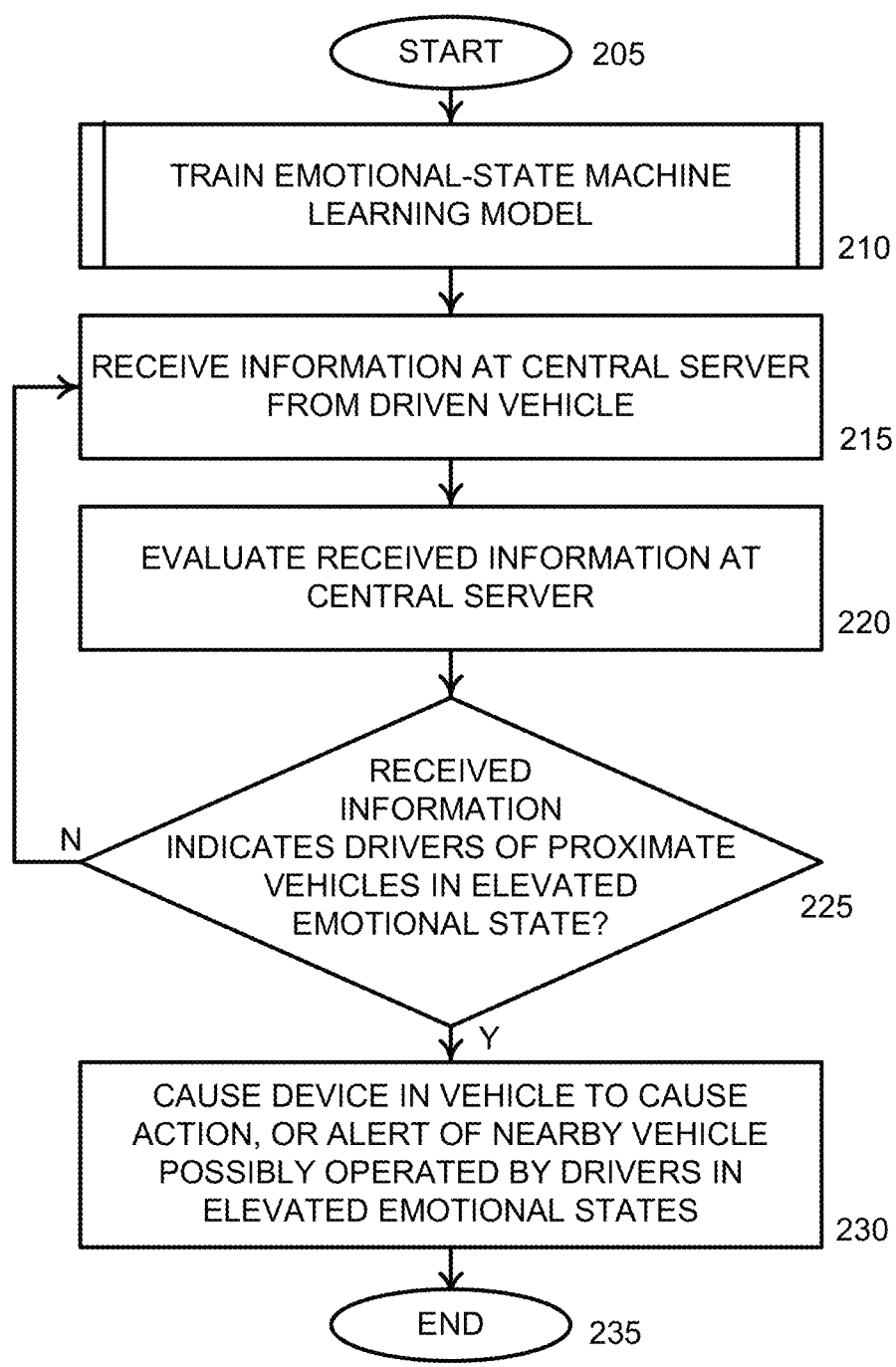
FIG. 2 illustrates a flow diagram of a method for causing an action in a driven vehicle in response to a determination that a proximate vehicle is driven by a driver in an elevated emotional state.

Turning now to FIG. 2, the figure illustrates a flow diagram of a method 200 for causing an action in a driven vehicle in response to a determination that a proximate vehicle is driven by a driver in an elevated emotional state. Method 200 begins at step 205. At step 210, a baseline emotional state determining machine learning model is trained with input information that may include emotional state parameter information, which may be referred to as 'driver behavior information,' 'driver behavior characteristic information,' 'human characteristic information,' or 'human behavior information,' and which may be generated by one or more cockpit sensors described above in reference to FIG. 1. Emotional state parameter information may also be received from a user device such as a smart phone, tablet, laptop, or desktop, either wirelessly, via a wired connection, or via information stored at a central server associated with an application used by the user of the user device. For example, an emoticon selected by the driver in a vehicle while using a social media application may be emotional state parameter information that indicates the user's emotional state. The driver may select the emoticon, or express with a picture, with a meme, or in words his, or her, emotional state during a current drive, or before making the current drive such that the most recent posting or expression of an emotional state with the social media application indicates an elevated emotional state. It will be appreciated that safe and prudent driving practices do not include using smart phone applications while driving. Information that a driver is using an application such as a social media application may be used as a training input to the machine learning model.

Inputs that are used to train the machine learning model may also include vehicle operational parameter information, such as information obtained from vehicle sensors that are coupled to, or in communication with, a vehicle communication bus (in modern vehicle most vehicle sensors are coupled to a communication bus, such as a controller area network ("CAN") bus, or similar, but information from a user device may be received on the bus wirelessly via a wireless interface to the bus, such as a Bluetooth or Wi-Fi interface). Examples of vehicle operational information from vehicle sensors include information corresponding to vehicle operational parameters such as acceleration (which may be in relation to aggressiveness, in relation to load, in relation to road incline, in relation to road curvature, etc.), braking (force, rapidity, failure to fully release, etc.); steering wheel angle, motion, and speed; use of accessories, such as stereo, infotainment system, navigation system, windows, seat adjustment, interior lights, exterior lights, windshield wipers, sun roof, etc. More detailed description regarding the training of the emotional state machine learning model at step 210 is provided in reference to other figures herein, including in reference to FIG. 3.

Continuing with description of FIG. 2, at step 215, a central server that may include one or more devices having one or more processors, such as may be operated by a telematics provider, by a vehicle manufacturer, by an insurance provider or contractor, by a traffic information provider or traffic information aggregator, by a government agency such as a department of transportation, by a law enforcement agency, etc., receives information from a driven vehicle. The central server may be one or more devices at a single location, or may be several computer devices distributed at different physical locations. In addition, the term server may refer to a user device acting as a server in client server session established with another device that may be in another currently operated vehicle. The terminology 'driven vehicle' may be used herein in reference to a perspective that focuses on a vehicle among a plurality of vehicles currently driving on a road relative to other vehicles of the plurality of vehicles, which other vehicles may be proximate the driven vehicle and one or more of which may be determined as being driven by a driver, or drivers, in an elevated emotional state, or states. It will be appreciated that the terminology 'driven vehicle' may refer to any of the plurality of vehicles currently driving that a perspective relative to other vehicles currently driving focuses on. The received information may include vehicle operational parameter information, driver emotional state parameter information, and location of the vehicle information. Received information may also include identification information that can identify the vehicle via a unique identifier such as a VIN, information contained in a wireless signal such as a MAC address that uniquely identifies a wireless transmitting device (i.e., a user's smart phone or a wireless device that is manufactured as part of the vehicle that can transmit vehicle operational information generated by vehicle sensors), or via any other information that may identify the vehicle.

In addition, information received at step 215 may be information that describes other vehicles proximate the driven vehicle that is sending the information. For example, a camera of the driven vehicle may obtain an image of another vehicle's license plate and transmit the image, or a text string and jurisdiction (i.e., tag number and state that issued the license plate, or tag) to the central server. The driven vehicle may also transmit (either with an embedded wireless device such as a telematics platform, or with a user's device such as a smart phone) descriptive information of another vehicle such as color, make, model, type, style, style of wheels/tires, etc. to the central server. The descriptive information, as well as the license plate information, may be transmitted as an image, or the driven vehicle, or user device at the driven vehicle, may perform image recognition processing with a computer vision application on a captured image and translate information that the computer vision application 'observes' into text that may be transmitted to the central server for evaluation.

At step 220, the central server/computer device evaluates the information received at step 215. Such evaluation may include using a received VIN to look up information in a table, database, or other storage technique that may be used to determine at step 225 whether a vehicle proximate to the driven vehicle is being driven by a driver that is in, or likely is in, an elevated, or agitated, emotional state. Such a determination at step 225 may be based on whether the central server has information that the proximate vehicle has been previously associated with a driver who drove in an elevated emotional state, either in the particular proximate vehicle or in another vehicle. Alternatively, the central server may currently have an active communication session with the proximate vehicle and can obtain real-time vehicle operational parameter information or driver emotional state parameter information about the proximate vehicle to use in evaluating whether the driver of the proximate vehicle is operating his, or her, vehicle in an elevated emotional state. In an aspect, the driven vehicle may have transmitted information describing its current location, such as location coordinates generated by a global positioning satellite system, or based on information received from a wireless communication network, such as a Long Term Evolution ("LTE") telephony/data network or the like, to the central server, which may determine that drivers at, or about, the transmitted location, have a certain predetermined degree of likelihood of driving in an elevated, or altered, emotional state.

If the central server determines at step 225 that a proximate vehicle has a likelihood (for example, based on comparison of received information to predetermined emotional state criteria) of being driven by a driver in an elevated, or agitated, emotional state, the central server may transmit at step 230 a wireless signal to the driven vehicle, or to a user device in the driven vehicle, to alert the driver of the driven vehicle that he, or she, should increase caution and awareness of potentially emotional drivers/erratically-driven vehicles proximate the driven vehicle. It will be appreciated that the term proximate refers herein to other vehicles that are proximate a driven vehicle within a predetermined area of the driven vehicle, but proximate vehicles as well as driven vehicle are typically driven. However, it will be appreciated that a driven vehicle may be 'driven' by autonomous mechanisms, such that the alerting, causing of an action at, or notifying the driven vehicle of the proximity to one or more vehicles driven by a driver in an elevated emotional state may be transmitted to a computer, device, or processor thereof, that is in control of operating the 'driven' vehicle. The predetermined area relative to the driven vehicle may be a predetermined shape defining a virtual geofence around the driven vehicle, such as a circle having a predetermined radius, or another shape defining a geofence boundary around the driven vehicle. In addition, the predetermined area may be a geofence, or boundary, that substantially overlies roadways, such as an intersection or entrance to a roadway, that are near the driven vehicle's current location. If at step 225 the central server does not determine that one or more proximate vehicles are driven by drivers in elevated emotional states, method 200 returns from step 225 to step 215 and the central server continues receiving information. Method 200 ends at step 235.

It will be appreciated that although FIG. 2 has been described in reference to a central server receiving information from a vehicle and determining whether proximate vehicles are driven by drivers in an elevated, or agitated, emotional state, some or all of the steps of FIG. 2 could be performed by a user device, such as a smart phone in the driven vehicle. Also, it will be appreciated that although the focus in the description of FIG. 2 above is on generating, or causing the generation of, an alert or other action in the driven vehicle that erratic drivers may be operating vehicles proximate the driven vehicle, the steps could also be performed relative to the proximate vehicles themselves. For example, a traffic information provider may receive information from a plurality of vehicles that are in a fleet, the owners of which have agreed to permit the collection of information therefrom (i.e., the owners may have permitted the collection of operational parameter information, emotional state parameter information, location information, identification information, etc.). The fleet may include a given driven vehicle and some of the vehicles that are proximate the driven vehicle at a given time. Thus, a driven vehicle and the vehicles proximate it may be substantially simultaneously transmitting information to the central traffic provider server, which may be monitoring and evaluating the information received from the plurality of vehicles in the fleet and sending alerts to more than one of the vehicles substantially simultaneously. In an example, two vehicles that are a part of a fleet of monitored vehicles may each be operated proximate one another (i.e., within a predetermine shape and range of each other) by a driver in an elevated emotional state. Thus, from a first vehicle perspective, the first vehicle may be a driven vehicle that transmits information that indicates that its driver is either currently operating, or has operated, the driven vehicle in an elevated emotional state and the first vehicle may receive an alert message that a second vehicle proximate the first vehicle, which second vehicle is also transmitting information to the central server, is being operated by a driver in an elevated emotional state. In turn, from the perspective of the second vehicle, the second vehicle may also receive an alert that the driver of the first vehicle that is proximate the second vehicle is being operated by a driver in an elevated emotional state.

Figure 3:
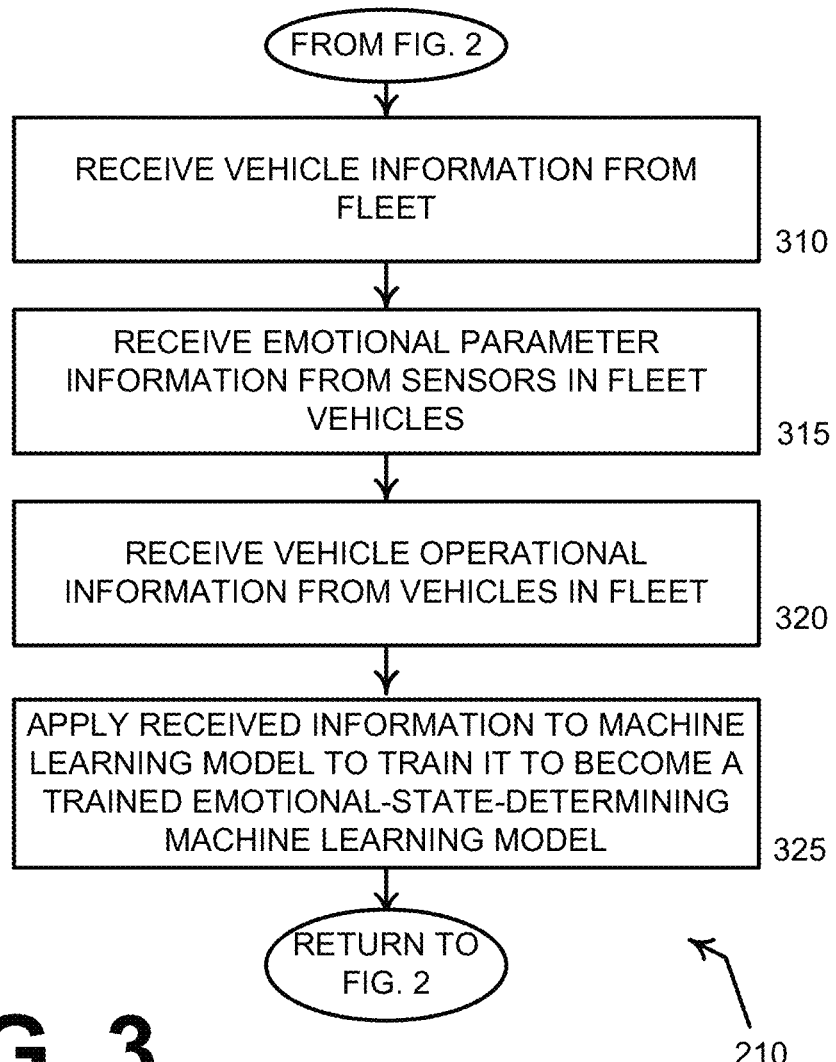
FIG. 3 illustrates a flow diagram of a method for training a machine learning model to determine, based on vehicle operation parameter information but not based on driver emotional parameter information, that a vehicle is operated by a driver in an elevated emotional state.

Turning now to FIG. 3, the figure illustrates a flow diagram of method 210, as referenced above in the description of FIG. 2, for training an emotional state machine learning model during a training period so that it can determine, based on vehicle operation parameter information but not based on driver emotional state parameter information, that a vehicle is operated by a driver in an elevated emotional state. Before the steps 215-230 described above in reference to FIG. 2 are performed, a machine learning model, which may comprise a deep learning algorithm, a convolutional neural network, a neural network, support vector machines ("SVM"), regression, or other similar techniques, methods, or functions, may be trained to become a trained machine learning model. The machine learning model may be designed to determine whether a person who may be driving a vehicle is experiencing an elevated emotional state. In such an implementation, the machine learning model may be referred to as an emotional state determining machine learning model and the trained version of the emotional state determining machine learning model may be referred to as a trained emotional state determining machine learning model. The emotional state determining machine learning model or the trained emotional state determining machine learning model may be implemented by instructions executed by, or run on, a computer processor or device such as a central computer server, a user device such as a smart phone, tablet, wearable device, lap top computer, or desk top computer, etc.

The computer processor may receive information in data signals that are input to the processor, which may then apply the information received in the data signals to the emotional state determining machine learning model to train the emotional state determining machine learning model beginning at step 310. Information contained in the received data signals received at step 310 may include vehicle information, such as VIN information, or other information that may uniquely identify each of a plurality of vehicles in a vehicle fleet.

A given vehicle fleet may include vehicles that are all insured by a particular insurance provider and that participate in a monitoring program that monitors vehicle data, typically wirelessly, or via a device that may retrieve and upload vehicle operational characteristics from a vehicle's OBD-II port, or similar data port. A given fleet of vehicles may also comprise vehicles that were manufactured by the same manufacturer and that participate in a data-collection program operated by the manufacturer to collect operational characteristics and performance data. Or, a given fleet of vehicles may comprise vehicles that subscribe to given services, such as traffic information services, traffic flow scheduling services, telematics services (which may or may not be operated by the vehicles' manufacturer(s)), and the like.

At step 315, the processor may receive emotional parameter information from sensors that can detect emotional state/behavior characteristics parameter information of a driver, of a vehicle operator, or of a vehicle passenger that may change as the driver's, operator's, or passenger's emotional state changes. For example, the sensors discussed above in reference to FIG. 1 may produce signals that contained information received by the processor at step 315 in FIG. 3.

At step 320, the processor may receive vehicle operational information that represents monitored operational characteristics, such as braking, acceleration, steering, gear selection, entertainment head unit usage, user device application usage, speed, engine load, temperature, engine temperature, use of windshield wipers, battery level, fuel level, fuel usage rate, battery usage rate, use of HVAC system, and the like.

At step 325, the processor may apply the information contained in signals received by the processor at steps 310, 315, and 320 to an emotional state determining machine learning model to train it to become a trained emotional state determining machine learning model. When data from a plurality of vehicles train the emotional state determining machine learning model during a training period at step 325, the resulting trained emotional state determining machine learning model may generate emotional state criteria that can be used as thresholds or limits for evaluation of vehicle operational data that are transmitted by, and received from, one or more vehicles after the training period—the one or more vehicles that transmit vehicle operation parameter data after the training period may, or may not, have been part of the fleet that transmitted data at steps 310, 315, and 320 during the training period. The emotional state criteria may include values for parameters that are used for comparison to real-time values at a central server for the same parameters that are generated at, and receive from, vehicle devices after the training period, during which training period steps 310-325 may be iterated multiple times. (It will be appreciated that a trained emotional state determining machine learning model, or criteria that are based on it, may be distributed to user devices, such as smart phones, that may receive information from proximate vehicles and that may perform the steps described in reference to FIG. 2.)

Comparisons of real time operational parameter values, such as values contained in data signals that convey information of a vehicle's speed, braking, acceleration, steering wheel operation, vertical, horizontal, and axial forces from accelerometers, to the emotional state criteria limits or thresholds may be used to determine that a driver of the vehicle having the sensors that generated the real time parameter values is driving in an elevated emotional state because the trained emotional state determining machine learning model was trained with real time operational parameter value information and emotional state parameter value information. In other words, the trained emotional state determining machine learning model 'learned' how certain operational parameter values correspond to certain emotional state parameter values, which in turn correspond to certain emotional states of drivers that drove the vehicle of a fleet during the training period during which the emotional state determining machine learning model was trained. It will be appreciated that the emotional state criteria may have been generated from a fleet that includes a given driver who's current, real time operational parameter value information is received at step 220 of FIG. 2, and who may be considered a proximate driver as discussed in reference to FIG. 2. Or, the emotional state criteria may have been generated from a fleet during a training period that did not include a vehicle/driver that is currently under evaluation as a proximate driver/vehicle in reference to the description of FIG. 2 above. After step 325 show in FIG. 3, method 210 returns to step 210 shown in FIG. 2.

Figure 4:
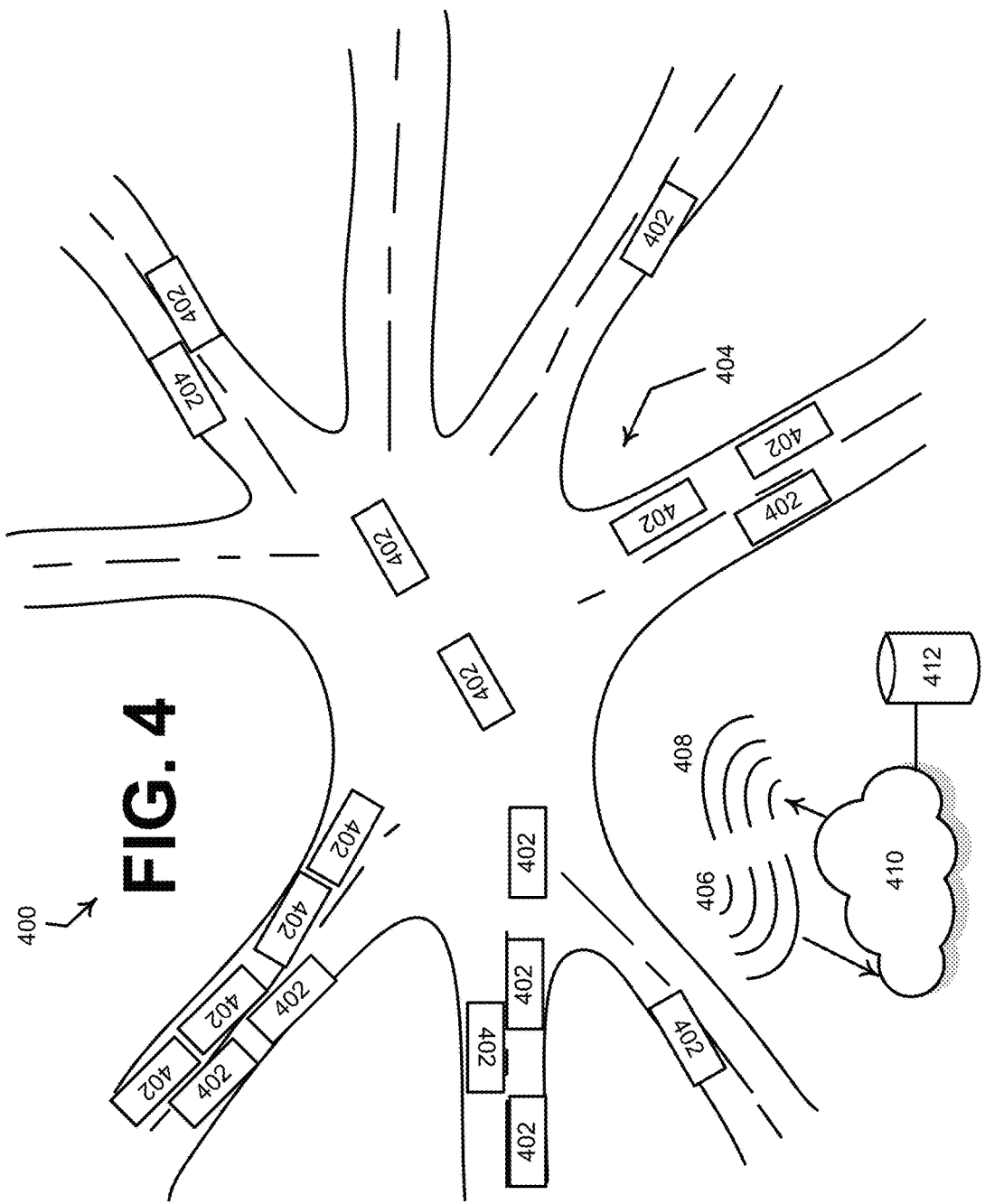
FIG. 4 illustrates a roadway environment with a fleet of vehicles from which information is transmitted and used to train an emotional state determining machine learning model.

Turning now to FIG. 4, the figure illustrates a roadway environment 400. Environment 400 includes a fleet of vehicle 402 traversing road system 404. Vehicles 402 may wirelessly transmit data signals along wireless data link 406 and receive data signals along wireless link 408, which may be part of communication network 410. Communication network 410 may include an LTE, or similar, packet core network, or similar network as technology advances and evolves. Central server 412 is shown coupled to communication 410. Central server may be a telematics server, a traffic information services provider server, an insurance company's or insurance consortium's server, or the other types of servers discussed above. Each of the fleet of vehicles 402 may transmit information generated by processors in them, at them, by devices in them, or by sensors in them. The information that the processors of the fleet of vehicles 402 may transmit may be generated by sensors that monitor operational parameters of the respective vehicle, such as accelerator position, steering wheel position and action, braking operation, vehicle speed, vehicle location (typically determined from a GPS receiver), accelerometer data, accessory operation etc.—typical information that is generated by sensors and modules that are coupled to a communication bus of the vehicle, such as a CAN bus. The information transmitted from vehicles 402 may also include VIN, or other identification information that is uniquely associated with the corresponding vehicle. Information transmitted from vehicles 402 may also include information from sensors that monitor human characteristics of the drivers (i.e., emotional state parameter information), such as cameras, microphones, pressure sensors, motion sensors, accelerometers, etc., which may include sensors, shown in FIG. 1, and similar sensors, that can monitor, measure, detect, or otherwise discern human behavior and characteristics. Such human characteristic information may be transferred from the sensors that generate it to an electronic control module/central processor of the vehicle for processing and for transmitting along link 406. Sensors that generate human behavior/characteristic information may be part of wearable devices that the driver wears, such as a wrist-worn device, a head-worn device, a garment, a ring, shoes, etc. Sensors that generate human behavior/characteristic information may be part of a user device such as a smart phone, which may also be wirelessly coupled, or coupled by wire, with the vehicle communication bus, and may transmit the human characteristic information as well as the vehicle operational information and identifying information along link 406 to server 412.

Figure 5:
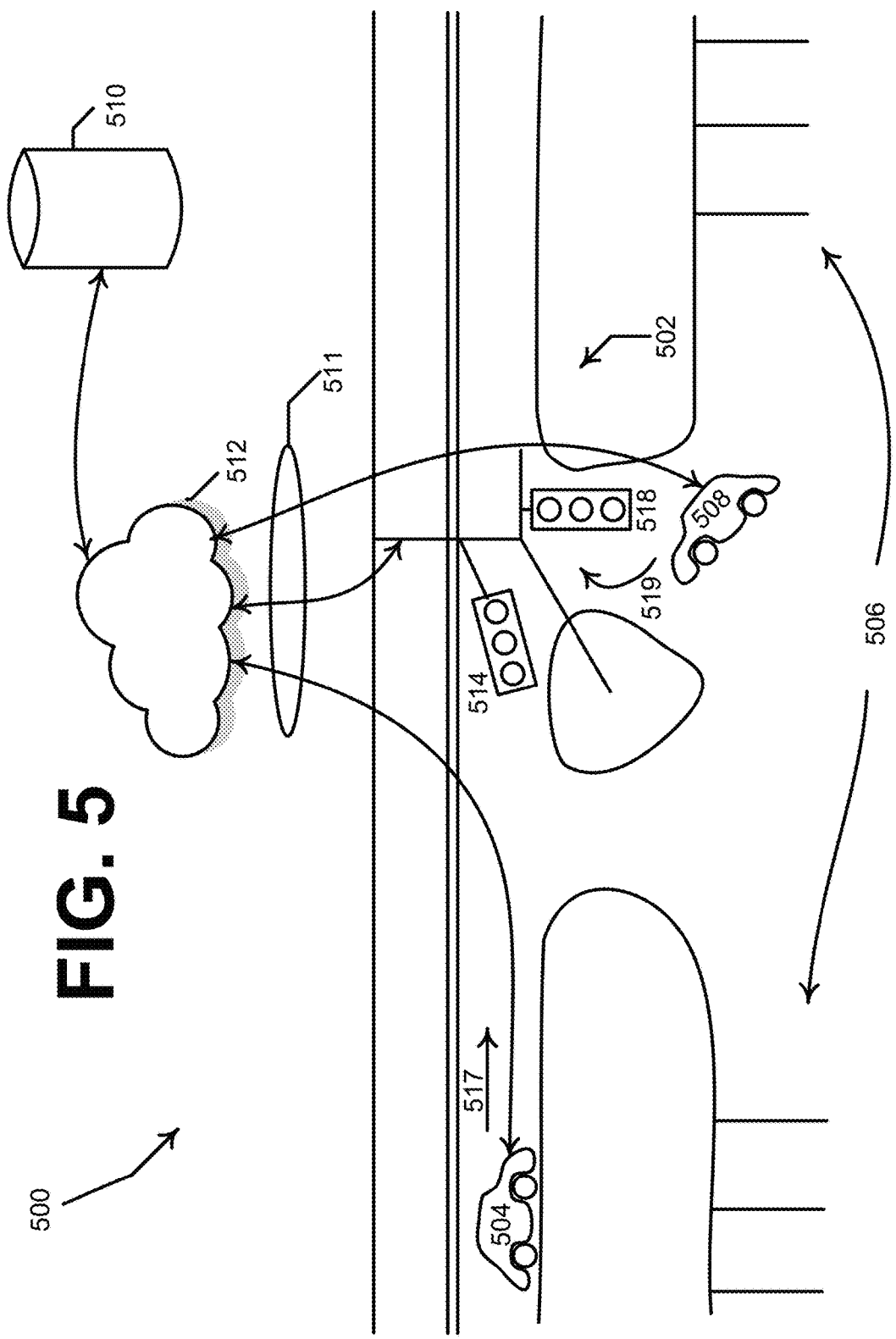
FIG. 5 illustrates a roadway environment with a driven vehicle encountering a proximate vehicle.

Turning now to FIG. 5, the figure illustrates an environment 500 with roadway 502. Driven vehicle 504 is shown approaching an entrance/exit to parking lot 506, from which vehicle 508 is about to leave and enter roadway 502. Assuming that the figure is substantially drawn to scale, vehicle 508 may be deemed as proximate vehicle 504 because it is moving along an entrance to the road on which vehicle 504 is traveling. It will be appreciated that the terms 'driven vehicle' and 'proximate vehicle' may be reversed and the perspective of vehicle 508 may be focused on as the driven vehicle and vehicle 504 may be referred to as the proximate vehicle. Both vehicles may wirelessly transmit information to, or receive information from, central server 510 via wireless links 511 and via communication network 512. In a first scenario, traffic control device 514 (which may be a smart traffic control device that can provide messages to vehicles on roadway 502, and which messages may include alerts that a proximate vehicle may be driving erratically or in an elevated emotional state) may display a red light for traffic travelling in direction 517. Traffic control device 518 may simultaneously display a green light for traffic in direction 519. Both vehicles 504 and 508 may transmit their current location information (i.e., GPS coordinates), vehicle operational parameter information (i.e., brake application, throttle/accelerator pedal position, or vehicle identification information (i.e., VIN) to server 510. Traffic control devices 514 and 518 may be controlled by server 510 or another server in communication with network 512, or the traffic control devices may be programmed to change status independently of instruction from server 510 or another server, but may nevertheless report their current statuses (i.e., red, yellow, green, current message, etc.) to server 510 or another server in communication with network 512.

Server 510 may be programmed to evaluate information received from vehicles 504 and 508, as well as from other vehicles, and to determine, based on the received information, whether either vehicle 504 or 508, or another vehicle, is currently driven by a driver in an elevated emotional state that might correspond to the driver operating his, or her, vehicle in an erratic or unsafe manner. If server 510 has substantially continuously been receiving information from vehicle 504 during its current trip, the server may have already determined whether the driver of vehicle 504 is driving in an elevated emotional state based on operational characteristic information associated with the vehicle's unique identifier (i.e., the VIN of vehicle 514 received from vehicle 504. Server 510 may have processed and applied information received from vehicle 504 during the vehicle's current trip that led the vehicle to the intersection shown in roadway 502, which information may have included inconsistent speed relative to surrounding traffic on the same roadway traveling in the same direction simultaneously with vehicle 504. (It will be appreciated that server 510 may have had access to information transmitted from other vehicles in addition to vehicles 504 and 508 to assess relative traffic flow/speed surrounding vehicles 504 and 508 as they traveled.) Other examples of erratic driving behavior information that may indicate an elevated emotional state include disregarding traffic control devices before encountering traffic control device 514, accelerating quickly from multiple traffic control devices before encountering device 514, etc. Alternatively, vehicle 504 may have transmitted human behavior/characteristic information to sever 510, such as loud yelling or angry facial expression information, which information may have been generated by sensors such as microphone 136, and cameras 112 and 116 in cockpit 100 shown in FIG. 1. Processing unit 130 of vehicle 504 may have evaluated the sound and image information and may determine its driver's current emotional state itself before transmitting its determination to server 510, or unit 130 may transmit sound and facial expression information (i.e., audio and video data), and pressure information, to server 510 for further evaluation.

Server 510 may apply received vehicle operational information corresponding to vehicle 504, such as braking, steering, acceleration, etc., and vehicle identification information that corresponds to the vehicle that transmitted the operational information, to an emotional state determining trained machine learning model to determine whether the driver of the vehicle from which the operational and identification information was transmitted is driving in an elevated emotional state. Server 510 may apply human behavior/characteristic information, such as audio, video, steering wheel grip pressure, etc., that has been received from the vehicle to the trained machine learning model to determine whether the driver of the vehicle from which the human behavior/characteristic information was transmitted is driving in an elevated emotional state.

Server 510 may transmit a message, such as an alert message, or a message to cause an alert, or other action, at a vehicle that receives the message, to driven vehicles that are within a predetermined area relative to the driven vehicle. The predetermined area may be defined by a predetermined radius from the driven vehicle, a predetermined radius from the proximate vehicle for which server 510 has determined is being driven by a driver in an elevated emotional state, or a predetermined distance along one or more possible routes that may place the driven vehicle and the vehicle being driven by a driver in an emotional state and (i.e., the proximate vehicle) in a scenario where one or the other should yield the right-of-way to the other, or in a scenario where one of the vehicles may cause a collision if the vehicle being driven by the driver in the elevated emotional state does not follow 'rules of the road.' Shapes other than a circle, or other than those that substantially cover roads near a driven vehicle may also be defined as a predetermined shape for purposes of determining whether a vehicle is proximate a given driven vehicle.

Server 510 may determine that a vehicle is proximate another vehicle based on having received current location information and corresponding vehicle identification information from the vehicles. Typically, this information may be transmitted by each vehicle, whether deemed a driven vehicle (i.e., vehicle that receives an alert message about another vehicle) or a proximate vehicle (i.e., vehicle about which an alert message is sent to other vehicle—the vehicle being driven by a driver determined to be in an elevated emotional state may also receive an alert message). Alternatively, a particular driven vehicle may substantially continuously (i.e., periodically at a predetermined rate), transmit information from images of surrounding vehicles generated by cameras that capture external surroundings of the driven vehicle. If an image of a surrounding vehicle includes a license plate of a surrounding vehicle, a processor onboard the driven vehicle may determine the license plate number and state/jurisdiction of the surrounding vehicle and transmit such identification information to central server 510, which may then determine whether the surrounding proximate vehicle has a history of being driven by a driver in an elevated emotional state, or whether vehicle operational parameter information and identification information, and recent driver behavior/characteristic information (e.g., information transmitted from the proximate vehicle during its current trip) may indicate that the proximate vehicle is currently driven by a driver in an elevated emotional state. The processor on board the driven vehicle may be contained in an embedded device, such as a telematics device built into the vehicle or plugged into a diagnostic port of the vehicle, or the onboard processor may be contained in a user device such as a smart phone.

Alternatively, the processor on board the driven vehicle may transmit an image that contains a view of a license plate of a surrounding vehicle to server 510, and the server may process the image to determine, either by itself or by communicating received information to another server such a government agency computer that can determine and transmit back, the identification of the surrounding vehicle based on the license plate number and jurisdiction. In an aspect, server 510 may determine the identification of the surrounding vehicle based on an image of the surrounding vehicle, by determining information from the image such as the surrounding vehicle's make, model, type, style, color, possible externally visible damage, etc. that may be uniquely associated with the surrounding vehicle, and that can be used to uniquely identify the surrounding vehicle.

In an aspect, server 510 may transmit control signals to traffic control devices 514 and 518 based on a determination that a driver in an elevated emotional state is operating a vehicle on roadway 502. For example, if server 510 determines that vehicle 504 is driven by a driver in an elevated emotional state, the server may send a signal to traffic control device 518, which may include a message to override a programmed timing control program for the traffic control device, to cause traffic control device 518 to display red, or STOP, for example, until vehicle 504 has passed in direction 517 through the intersection shown as part of roadway 502.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents. Disclosure of particular hardware is given for purposes of example. In addition to any recitation above in reference to the figures that particular steps may be performed in alternative orders, as a general matter steps recited in the method claims below may be performed in a different order than presented in the claims and still be with the scope of the recited claims. A computer-readable medium may store instructions comprising steps described in reference to the figures, which instructions may cause one or more devices having one or more processors to perform the method steps described in reference to the figures herein.

What is claimed is:

1. A method, comprising:
   receiving with a computer device information electronically transmitted from one or more vehicles proximate a driven vehicle within a predetermined area relative to the driven vehicle;
   evaluating with the computer device the received information;
   determining with the computer device that at least one of the one or more of the vehicles proximate the driven vehicle is driven by a driver associated with an elevated emotional state when the evaluated information corresponds to a vehicle driven by a driver in an elevated emotional state;
   wherein determining that at least one of the one or more of the vehicles proximate the driven vehicle is driven by a driver associated with an elevated emotional state includes applying at least some of the received information to a criteria set generated from training of a trained emotional state machine learning model with vehicle operational parameter information and with emotional state parameter information, and
   wherein the determining that at least one of the one or more of the vehicles proximate the driven vehicle is driven by a driver associated with an elevated emotional state includes applying only received vehicle operational parameter information to the criteria set.

2. The method of claim 1 further comprising causing an alert at the driven vehicle based on the determining that one or more of the vehicles proximate the driven vehicle is driven by a driver associated with an elevated emotional state.

3. The method of claim 1 wherein the received information includes vehicle information that uniquely identifies at least one of the one or more vehicles proximate the driven vehicle.

4. The method of claim 3 wherein the received vehicle information includes at least one of: license plate information, information descriptive of a vehicle, or VIN information.

5. The method of claim 3 wherein the received vehicle information includes location information of at least one of the one or more proximate vehicles.

6. The method of claim 1 wherein the received information includes vehicle operational parameter information generated by more than one sensor in communication with a communication bus of one of the one or more proximate vehicles.

7. The method of claim 1 wherein the received information includes driver behavior characteristic information generated by one or more sensors that measure emotional state parameter information of a driver.

8. The method of claim 1 wherein the received information includes location information of the driven vehicle.

9. A method, comprising:
   receiving with a computer device information electronically transmitted from one or more vehicles proximate a driven vehicle within a predetermined area relative to the driven vehicle;
   evaluating with the computer device the received information;
   determining with the computer device that at least one of the one or more of the vehicles proximate the driven vehicle is driven by a driver associated with an elevated emotional state when the evaluated information corresponds to a vehicle driven by a driver in an elevated emotional state;
   wherein the determining that at least one of the one or more of the vehicles proximate the driven vehicle is driven by a driver associated with an elevated emotional state includes applying at least some of the received information to a trained emotional state machine learning model that was trained with vehicle operational parameter information and with emotional state parameter information; and
   wherein the determining that at least one of the one or more of the vehicles proximate the driven vehicle is driven by a driver associated with an elevated emotional state includes applying only received vehicle operational parameter information to the trained emotional state determining machine learning model.

10. A method, comprising:
    receiving information transmitted from a plurality of vehicles during a training period;
    applying the received information to an emotional state machine learning model;
    generating a trained emotional state machine learning model based on the applied received information;
    wherein the information received during the training period used to train the emotional state machine learning model includes emotional state parameter information and vehicle operational parameter information; and
    wherein the trained emotional machine learning model determines whether a vehicle is being driven by a driver in an elevated emotional state based on operational information generated by the vehicle without using emotional state parameter information.

11. The method of claim 10 wherein an alert is generated based on the elevated emotional state determination.

12. The method of claim 11 wherein the alert is transmitted to a vehicle that is not the vehicle that the driver in the determined elevated emotional state is driving.

13. The method of claim 12 wherein the alert is generated when the vehicle operated by the driver who has been determined to be in an elevated emotional state and the vehicle that is not the vehicle that the driver in the determined elevated emotional state is driving are proximate one another within a predetermined area.

14. A device, comprising one or more processors to:
receive information electronically transmitted from one or more vehicles proximate a driven vehicle within a predetermined area relative to the driven vehicle;
evaluate the received information; and
determine that at least one of the one or more of the vehicles proximate the driven vehicle is driven by a driver associated with an elevated emotional state when the evaluated information corresponds to a vehicle driven by a driver in an elevated emotional state;
wherein the one or more processors are further to: apply at least some of the received information to a criteria set generated from training of an emotional state machine learning model with vehicle operational parameter information and with emotional state parameter information, wherein a determination that at least one of the one or more vehicles proximate the driven vehicle is driven by a driver associated with an elevated emotional state includes the one or more processors applying only received vehicle operational parameter information to the criteria set generated from training of the trained emotional state determining machine learning model.

15. The device of claim 14, wherein the one or more processors are further to: cause an action at the driven vehicle based on the processor determining that one or more of the vehicles proximate the driven vehicle is driven by a driver associated with an elevated emotional state.

16. The device of claim 14 wherein the received information includes vehicle information that uniquely identifies at least one of the one or more vehicles proximate the driven vehicle.

17. The device of claim 14 wherein the received information includes vehicle operational parameter information generated by more than one sensor in communication with a communication bus of one of the one or more proximate vehicles.

18. A device, comprising one or more processors to:
receive information electronically transmitted from one or more vehicles proximate a driven vehicle within a predetermined area relative to the driven vehicle;
evaluate the received information;
determine that at least one of the one or more of the vehicles proximate the driven vehicle is driven by a driver associated with an elevated emotional state when the evaluated information corresponds to a vehicle driven by a driver in an elevated emotional state, wherein the one or more processors are further to: apply at least some of the received information to a trained emotional state machine learning model that was trained with vehicle operational parameter information and with emotional state parameter information, wherein a determination that at least one of the one or more of the vehicles proximate the driven vehicle is driven by a driver associated with an elevated emotional state includes the one or more processors applying only received vehicle operational parameter information that does not include emotional state parameter information to the trained emotional state determining machine learning model.

* * * * *